(12) United States Patent
Gartland

(10) Patent No.: US 6,352,149 B1
(45) Date of Patent: Mar. 5, 2002

(54) CONVEYOR BELT WITH MICROCOIL SPRINGWIRE SENSOR

(75) Inventor: John James Gartland, Delaware, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 39 days.

(21) Appl. No.: 09/648,362

(22) Filed: Aug. 25, 2000

(51) Int. Cl.[7] ............................................... B65G 43/06
(52) U.S. Cl. .................................................. 198/810.02
(58) Field of Search ....................... 198/810.02, 844.1, 198/847, 502.1; 340/676

(56) References Cited

U.S. PATENT DOCUMENTS

| | | |
|---|---|---|
| 3,731,113 A | 5/1973 | Lowe et al. |
| 3,742,477 A | 6/1973 | Enabnit |
| 3,792,459 A | 2/1974 | Snyder |
| 3,834,518 A | 9/1974 | Specht et al. |
| 3,834,524 A | 9/1974 | Ratz et al. |
| 3,899,071 A | 8/1975 | Duffy |
| 4,229,735 A | 10/1980 | Houck |
| 4,436,198 A | 3/1984 | Houck et al. |
| 4,463,434 A | 7/1984 | Haylett et al. |
| 4,470,120 A | 9/1984 | Haylett |
| 4,621,727 A | 11/1986 | Strader |
| 4,854,446 A | 8/1989 | Strader |
| 5,168,266 A * | 12/1992 | Fukuda .................. 198/810.02 |
| 6,047,814 A * | 4/2000 | Alles et al. ............ 198/810.02 |
| 6,264,577 B1 * | 7/2001 | Hutchins ............... 198/810.02 |

FOREIGN PATENT DOCUMENTS

WO    WO97/05047    2/1997

* cited by examiner

Primary Examiner—Christopher P. Ellis
Assistant Examiner—Mark A. Deuble
(74) Attorney, Agent, or Firm—Howard M. Cohn

(57) ABSTRACT

A conveyor belt with a microcoil springwire sensor, a method for manufacturing same, and a conveyor belt rip detection system incorporating same for monitoring the integrity of the conveyor belt. The system employs an external transmitter and an external receiver, the microcoil sensor configured substantially in a signal inverting configuration residing substantially in a single plane within the conveyor belt, said microcoil springwire sensor having loops coupled to the external transmitter, and to the external receiver. The microcoil springwire crosses through itself in at least one place such that the microcoil springwire resides substantially in a single plane throughout the sensor including the crossing places. Means may be provided to prevent short-circuiting of the conductor at the crossing places, the means including: adhesive, insulation coating the conductor, a tee having two grooves, and a tee having a first, second, third and fourth cylindrical dowel. Adhesive is also used to secure the conductor to the tees.

19 Claims, 17 Drawing Sheets

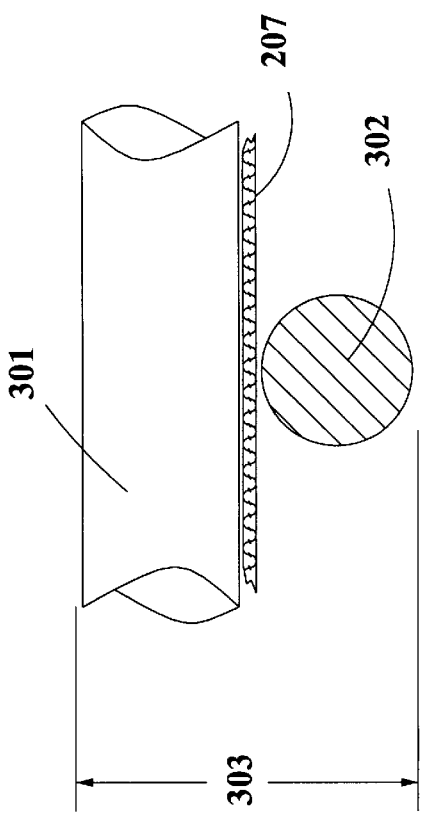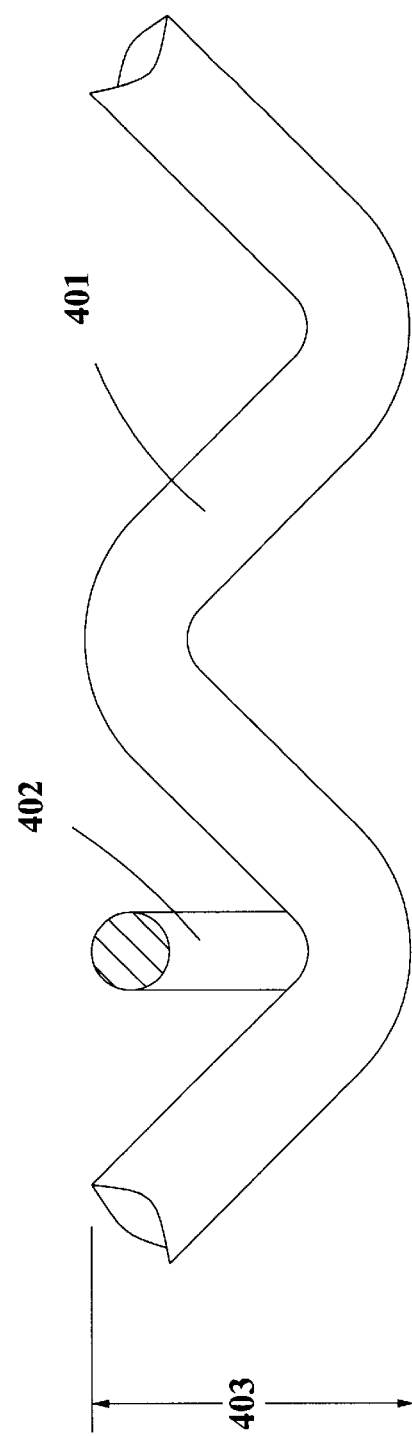
FIG. 3 (PRIOR ART)
FIG. 4

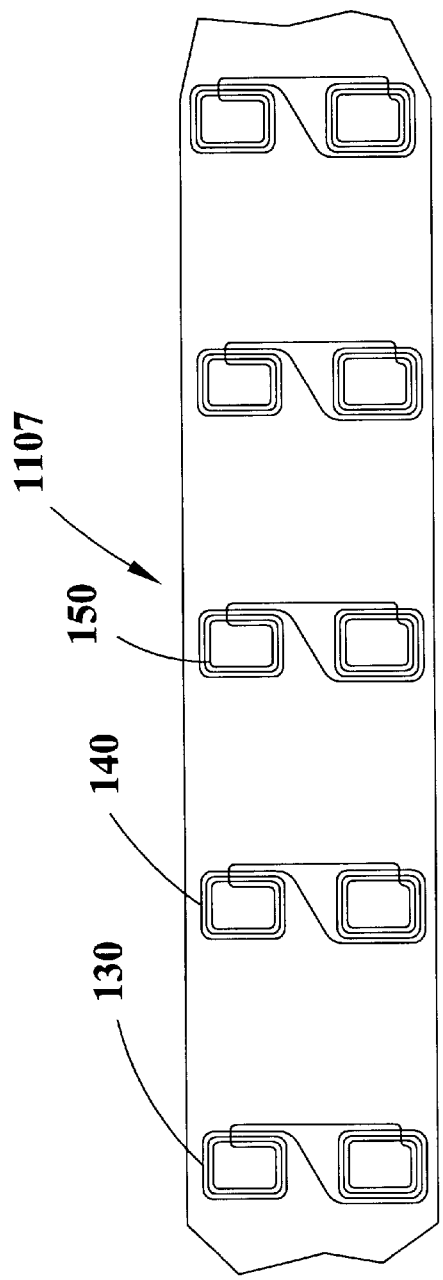
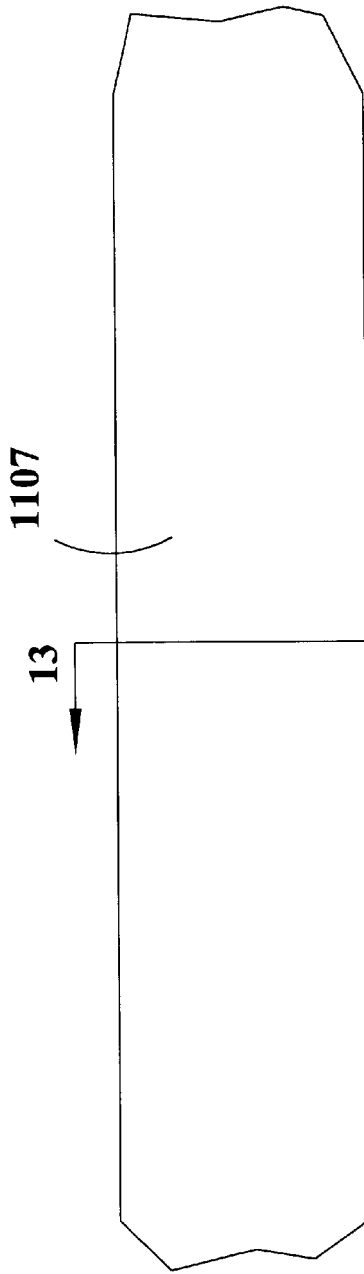
FIG. 16
FIG. 15

CONVEYOR BELT WITH MICROCOIL SPRINGWIRE SENSOR

TECHNICAL FIELD OF THE INVENTION

The invention relates to conveyor belts having electrical conductors, which are sensor loops embedded therein, and more particularly to belts having signal inverting type sensor loops.

BACKGROUND OF THE INVENTION

It is known to transport bulk materials, such as metallic ore and the like, with a heavy duty conveyor belt. These belts may be on the order of miles (1 mile=1.6 kilometers) long. Sharp edges of the material being transported may become lodged in such a position in the conveyor belt mechanism that they can cause a rip (slit, cut or tear) in the belt. When such a rip or tear commences, if the belt is not stopped, the rip can propagate longitudinally for a substantial distance along the belt. Ripped or torn portions of the belt must then be repaired. The costs can be quite formidable for repairing such heavy duty conveyor belts, as well as the cost of cleaning up material which has spilled off of the conveyor belt. It is therefore generally well known to detect and locate a rip in the belt as quickly as possible after it commences, thereby minimizing the extent of the damage to the belt.

It is therefore known to employ sensors within the conveyor belts as part of a rip detection system. These sensors may take the form of loops of conductive wire, and operate in conjunction with an overall rip detection system. Generally, the rip detection system functions by 'inferentially' determining whether a sensor (sensor loop) has been damaged, i.e., is an open circuit rather than a closed circuit, as a result of a rip or tear in the belt. Typically an electrical energy source external to the belt is inductively or capacitively coupled to a sensor in the belt. For example, a transmitter/receiver (exciter/detector) external to the belt and which is inductively or capacitively coupled to the sensor is used to detect a break in the conductive wire loop of the sensor. A plurality of such sensors may be disposed at a corresponding plurality of intervals along the length of the conveyor belt. Also, a plurality of exciter/detectors may be disposed at various locations adjacent the length of the belt. In this manner, the damage from rips or tears can be minimized.

U.S. Pat. No. 3,742,477 (Enabnit; 1973) discloses a conveyor belt condition monitoring apparatus for monitoring the open-circuited or close-circuited condition of electrical conductors associated with the conveyor belt. The electrical conductors comprise sensor loops, and are embedded in the conveyor belt. Generally, the monitoring apparatus comprises a detector circuit including an oscillator disposed so as to detect the proximate passage of a close-circuited (i.e., undamaged) sensor loop. The sensor loops disclosed in this patent each employ a single wire which passes (crosses) over (or under) itself in at least two places in order to form a pair of inverted coils. As a general proposition, an elongate element (e.g., a conductor), which is used to form a pair of inverted coils can be described as a "figure-eight sensor loop" will have at least one "crossover".

U.S. Pat. No. 4,621,727 (Strader; 1986) discloses a conveyor belt damage sensor in which conductors freely move during flexing of the belt by enclosing the conductors in low coefficient of friction jacketing envelopes. As illustrated in FIG. 5 of this patent, a (sensor) conductor is disclosed which comprises a coiled conductor (62) surrounded by an extruded thermoplastic resin envelope (60). Multiple formations of figure-eight sensor loops are disclosed wherein the conductor contained within its envelope passes (crosses) over/under itself multiple times.

U.S. Pat. No. 4,854,446 (Strader; 1989;"'446 Patent") discloses electrical conductors formed into a "figure-eight" pattern embedded in a conveyor belt. The electrical conductors of the sensor loops may be "wavy", in the form of a repeating flat sinusoidal wave form, to accommodate flexure of the belt without losing continuity (close-circuitness). A typical conveyor belt construction is shown in FIG. 6 of the patent. The belt (90) has a top layer (92) which has an outer load carrying surface or "cover", and a bottom layer (94) which has an outer pulley engaging surface or cover. The bottom layer is sometimes referred to as a "pulley cover". Reinforcing cables (98) are disposed between the top and bottom layers. Each of the top and bottom layers has a layer (100) of insulation gum on an inner surface thereof, for engaging with each other and with the cables (98). The electrical conductors (sensor loops) (108) are shown as being disposed between the bottom layer (94) and the cables (98), with an insulation layer (104) and an optional fabric layer (106) lying between the conductors (108) and the cables (98).

FIG. 1, comparable to FIG. 1 of the '446 patent, illustrates the prior art rip detection system as set forth in the '446 patent to Strader. A belt rip detection system is shown generally by reference numeral 100. An elastomeric conveyor belt 104 is driven around/over rollers or pulleys 102 and 103. A motor 110 provides the power to drive roller 103 which in turn drives the conveyor belt 104 in a direction of travel as indicated by arrow 111. Of course, the motor could also drive the belt in the opposite direction.

A plurality of conductors 105 (sensor loops or sensors) are embedded in the elastomeric belt 104 transverse to the direction of travel. The conductors 105 are arranged generally in a signal inverting format.

The conductors/sensors 105 may be used in connection with a rip detection system which may use either magnetic or electric fields for excitation/detection. The conductors 105 carry a current flow therein when subjected to an electrical or magnetic field. A rip in the belt 104 will eventually propagate far enough to cause one of the conductors 105 to be broken. A transmitter 106 emits an electrical or magnetic field which is communicated by conductors 105 to a receiver 107 provided that the conductor 105 is intact. Receiver 107 provides a signal to control circuitry 101 which can process the signal and indicate a rip. The rip signal may result in an alarm and/or a signal 108 to the motor controller 109 to automatically stop motor 110 and shut down the conveyor belt 104.

The electrical conductors 105 are embedded within a conveyor belt 104 which comprises an elastomeric body having a load carrying surface (cover) and a parallel pulley engaging cover with a reinforcement ply disposed within the elastomeric body. The electrical conductors 105 can be embedded into either the load carrying or the pulley engaging surfaces, located between reinforcing plies, or between a reinforcing ply and either load carrying or pulley engaging surface. The electrical conductors can be located either longitudinally or transversely with respect to the belt. The electrical conductors are arranged in a pattern such as a loop, oval, polygon, or in substantially a figure-eight.

FIG. 2, comparable to FIG. 6 in the '446 patent, illustrates the installation of a conductor in the prior art belt construction. Reference numeral 200 denotes a conveyor belt. Load bearing surface 202 is secured to reinforcing cables 204 by gum 203. Conductor assembly 205 is comprised of insulation 206, fabric 207 and wire 208. Tie gum 209 secures the conductor assembly 205 to the cables 204 and to a bottom pulley cover 210. Compactor 201 compresses the assembly together prior to the belt being fed to a press and finally vulcanized.

FIG. 3 illustrates the crossover of the insulated coated fabric and wire of the conductor caused by forming the figure eight sensor loop configuration as disclosed in the '446 patent. The total thickness of the crossover of insulated fabric 207 and wire portions 301 and 302 of a sensor loop 105 conductor assembly 205 is represented by reference numeral 303 and is twice the diameter of the wire plus the thickness of the fabric.

Although details of the conductor crossovers are not discussed in the prior art patents hereinabove, it should be apparent to those skilled in the art that the disclosed rip detection systems (e.g., 100) having sensor loops incorporating crossovers will not function properly unless the conductors (e.g., 105, 301, 302) are insulated or otherwise prevented from touching themselves (short-circuiting) wherever they cross over. In other words, a portion 301 of a sensor loop 105 must not be allowed to touch an other portion 302 of the same sensor loop 105.

It is desirable to minimize the thickness of conveyor belt sensors, while at the same time preventing short circuiting at sensor conductor crossovers, and also providing sensor conductors which will resist breakage due to flexure.

SUMMARY OF THE INVENTION

This invention concerns the use of microcoil springwire for conductors utilized for sensors in conveyor belt rip detection systems in order to achieve the objectives of minimizing the thickness of conveyor belt sensors, while at the same time preventing short circuiting at sensor conductor crossovers, and also providing sensor conductors which will resist breakage due to flexure.

According to the invention, a rip detection sensor for incorporation within a conveyor belt comprises a conductor formed in an endless loop arranged in a signal inverting configuration wherein the conductor crosses itself in at least one crossing place. The conductor is formed as microcoil springwire. The conductor crosses itself by crossing through itself such that the microcoil springwire resides substantially in a single plane throughout the sensor including the crossing places, and means are provided to prevent short-circuiting of the conductor at the crossing places.

According to the invention, the conveyor belt is characterized in that the short-circuit prevention means comprise insulation coating the conductor, or comprise adhesive applied between the microcoil conductor portions where they cross-through each other.

According to the invention, the conveyor belt is characterized in that the short-circuit prevention means comprise a tee having two grooves in which an elongated portion of the microcoil springwire conductor can reside to form a cross-through for the conductor, wherein the grooves are on opposite faces of the tee and are oriented substantially orthogonally to each other.

According to the invention, the conveyor belt is characterized in that the short-circuit prevention means comprise a tee having a first, second, third, and fourth cylindrical dowel, wherein the first and third dowels are on opposed sides of the tee, and the second and fourth dowels are on opposed sides of the tee; such that a first crossing portion of the microcoil springwire conductor can be wrapped around the first dowel, elongated to traverse a first side of the tee, and then wrapped around the opposing third dowel; and such that a second crossing portion of the microcoil springwire conductor can be wrapped around the second dowel, elongated to traverse a second side of the tee, and then wrapped around the opposing fourth dowel. The microcoil springwire conductor can be affixed to the tee with an adhesive.

According to the invention, the conveyor belt is characterized in that the microcoil springwire conductor comprises plated or coated high-tensile strength steel. Furthermore, the microcoil springwire comprises a coiled conductor with a pitch of between one to four conductor diameters, and a coil diameter of between 0.025 to 0.175 inches and preferably between 0.050 to 0.10 inches.

According to the invention, the conveyor belt comprises a top load bearing surface, a middle carcass layer, and a pulley cover, characterized in that the sensor is embedded within any of the three layers.

According to the invention, the conveyor belt is characterized in that the sensor includes loops configured for use in connection with a belt rip detection system which includes external transmitter/exciters, and receiver/detectors.

An aspect of the invention is a method of manufacturing a conveyor belt incorporating within it a rip detection sensor comprising a conductor formed in an endless loop arranged in a substantially figure-eight configuration wherein the conductor crosses itself in at least one crossing place, characterized by: forming the conductor as a microcoiled springwire; forming the crossing places such that the microcoil springwire conductor crosses through itself and resides substantially in a single plane throughout the sensor including the crossing places; and preventing short-circuiting of the conductor at the crossing places.

According to the invention, the method is characterized by insulating the conductor to prevent short-circuiting, or by providing adhesive between the conductor portions at the crossing places.

According to the invention, the method may be characterized by providing tees at the crossing places. The method further includes elongating portions of the conductor in the crossing places, wrapping the elongated portions of the conductor around the tees, and possibly affixing the conductor to the tees with adhesive.

A further aspect of the invention is a conveyor belt rip detection system, comprising a conveyor belt incorporating within it a rip detection sensor comprising a conductor formed in an endless loop arranged in a signal inverting configuration wherein the conductor crosses itself in at least one crossing place, and the sensor has loops. The system further comprises a drive motor, a driven roller driven by the drive motor, a following roller, an external transmitter and receiver coupled with the sensor loops, and control circuitry controllably connected between the external receiver and a motor controller for controlling the action of the drive motor. The conveyor belt rip detection system is characterized in that the conductor is formed as microcoil springwire; the conductor crosses itself by crossing through itself such that the microcoil springwire resides substantially in a single plane throughout the sensor including the crossing places; and means are provided to prevent short-circuiting of the conductor at the crossing places.

According to the invention, the conveyor belt rip detection system is characterized in that the means to prevent short circuiting is selected from the group consisting of adhesive, insulation coating the conductor, a tee having two grooves, and a tee having a first, second, third, and fourth cylindrical dowel or other non-conductive material positioned to prevent the two or more sections of microcoil from contacting each other.

Additional objects of the invention will be understood when reference is made to the Brief Description of the Drawings, Description of the Invention and Claims which follow hereinbelow.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the figures may be illustrated to a different scale than other elements in the same drawing, or elements of other figures. The cross-sectional views, if any, presented herein may be in the form of "slices", or "near-sighted" cross-sectional views, omitting certain lines which would otherwise be visible in a true cross-sectional view.

Figure 1:
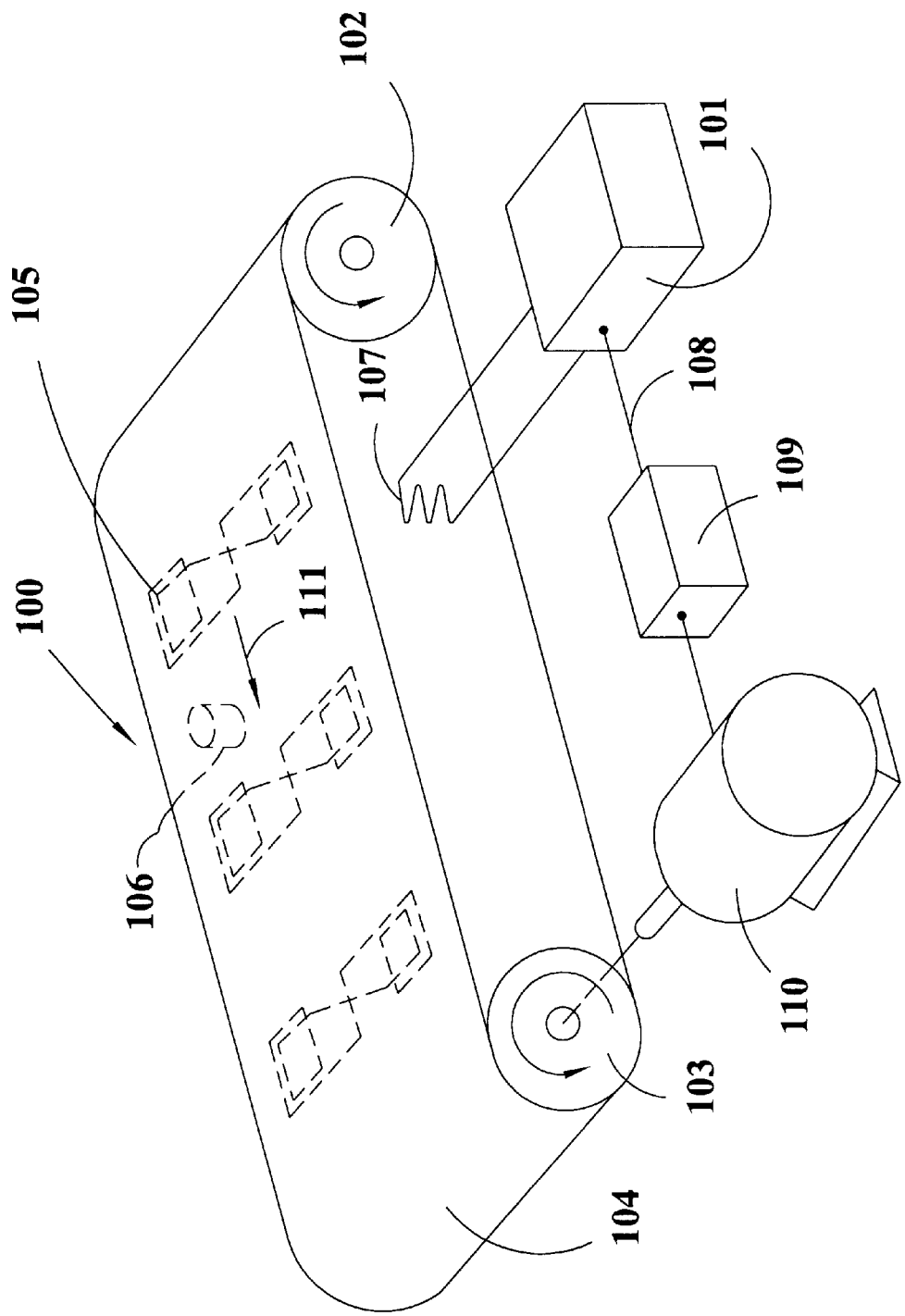
Figure 2:
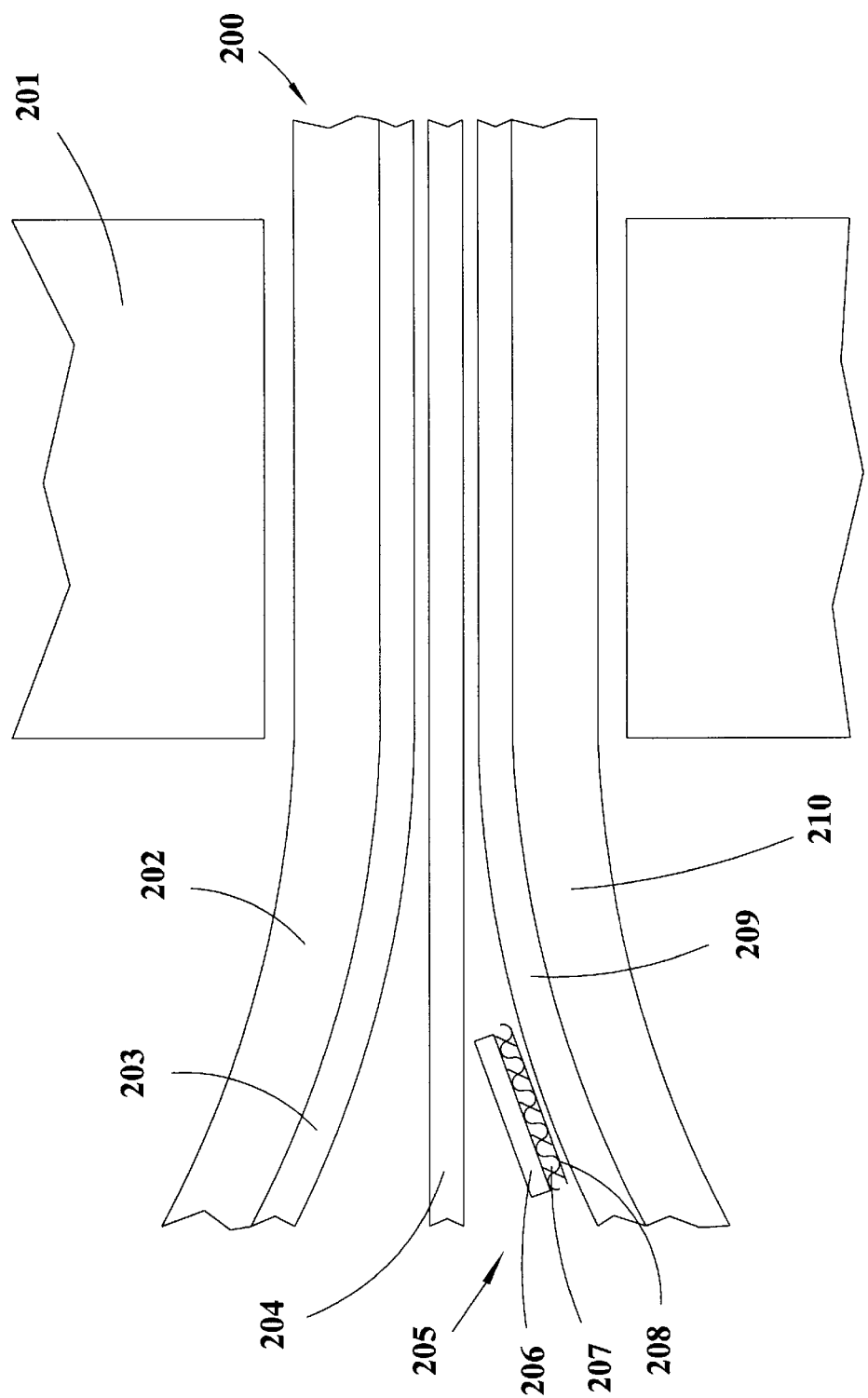

Elements of the figures are typically numbered as follows. The most significant digits (hundreds) of the reference number corresponds to the figure number. Elements of FIG. 1 are typically numbered in the range of 100–199. Elements of FIG. 2 are typically numbered in the range of 200–299. Similar elements throughout the figures may be referred to by similar reference numerals. For example, the element 199 in a figure may be similar, and possibly identical to the element 299 in an other figure. In some cases, similar (including identical) elements may be referred to with similar numbers in a single drawing. For example, each of a plurality of elements 199 may be referred to individually as 199a, 199b, 199c, etc. Such relationships, if any, between similar elements in the same or different figures will become apparent throughout the specification, including, if applicable, in the claims and abstract.

Figure 5:
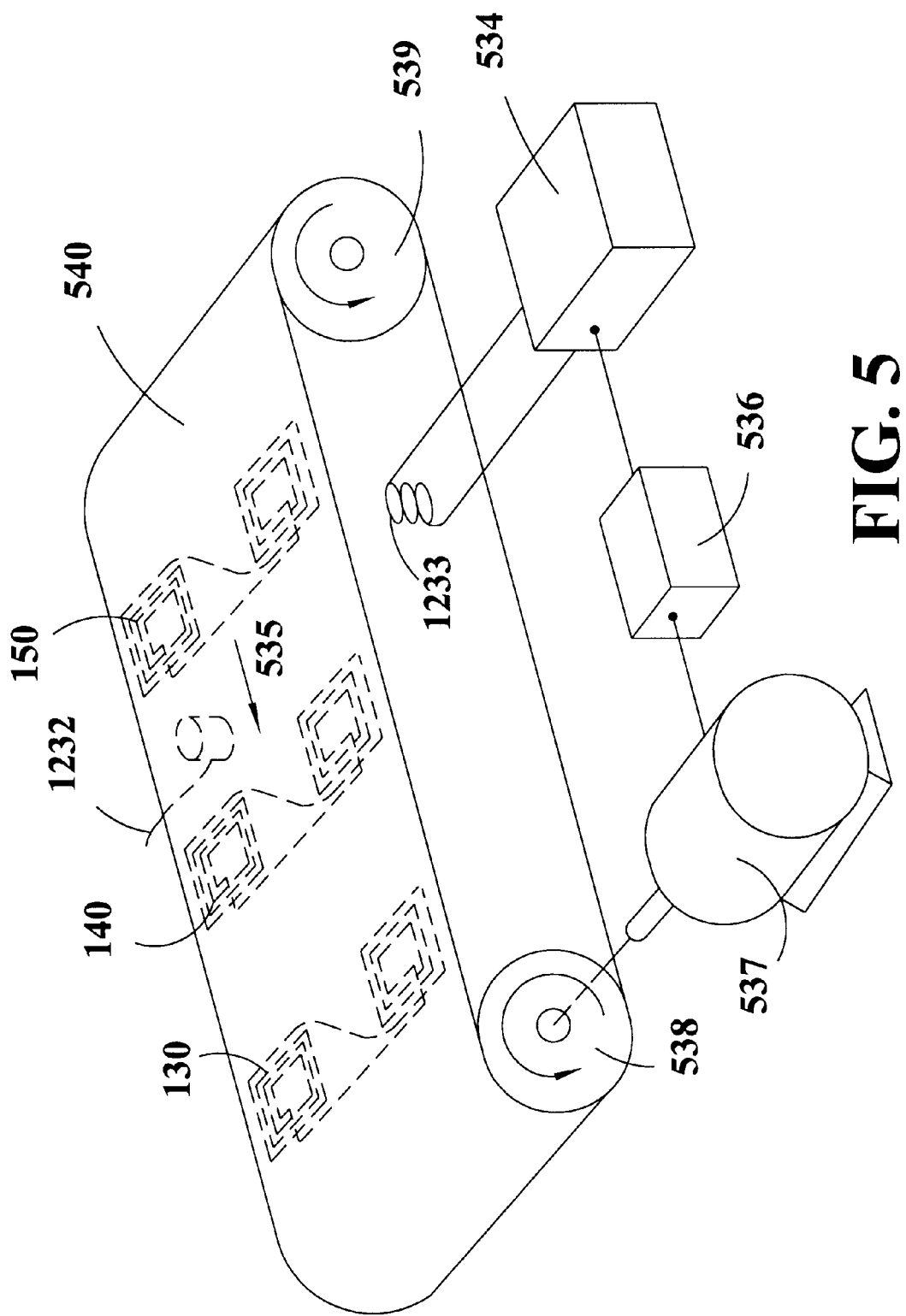
Figure 6:
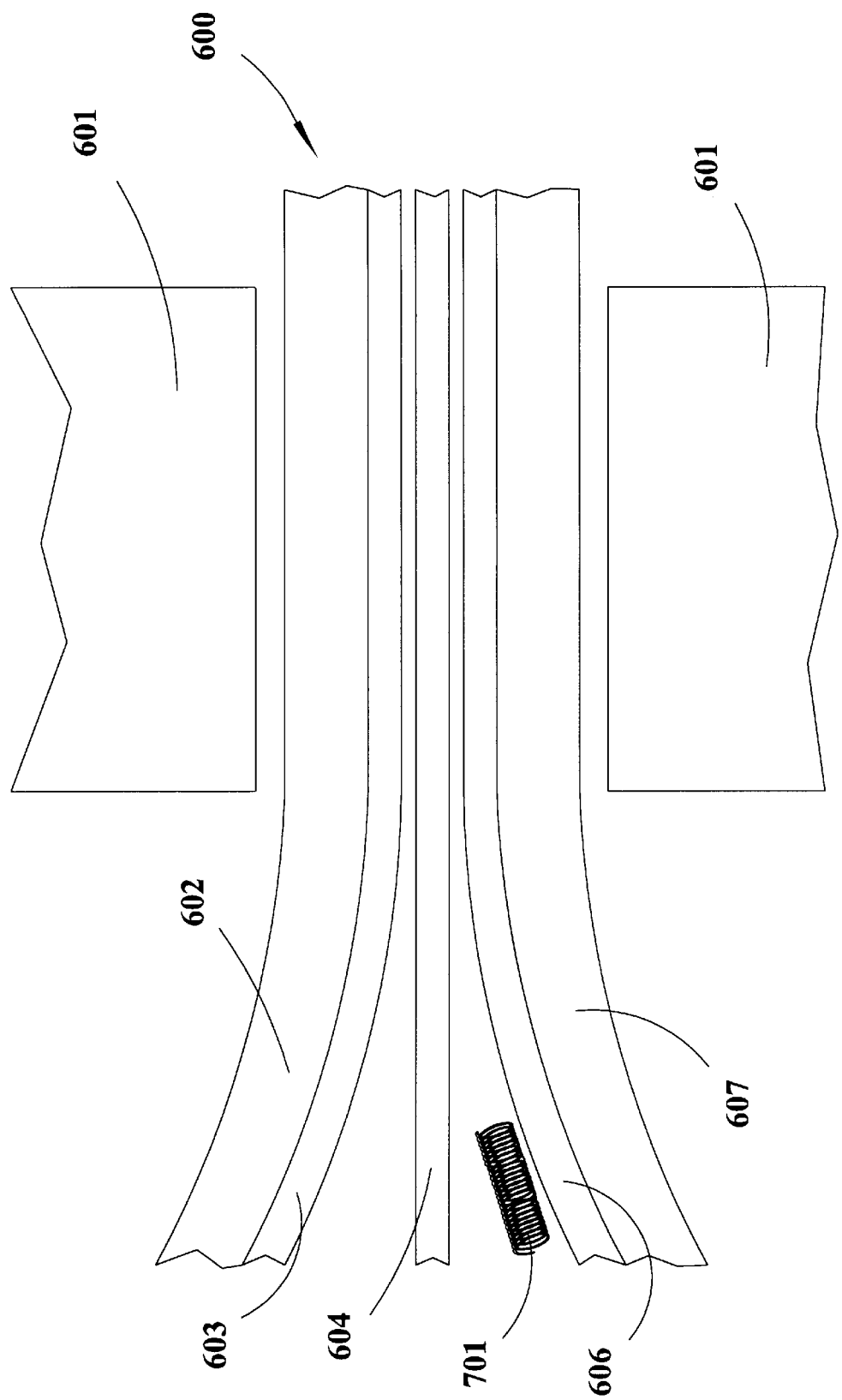
Figure 8:
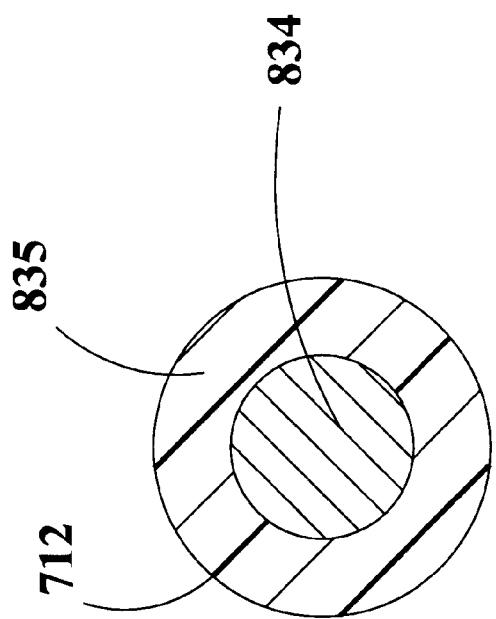
Figure 7:
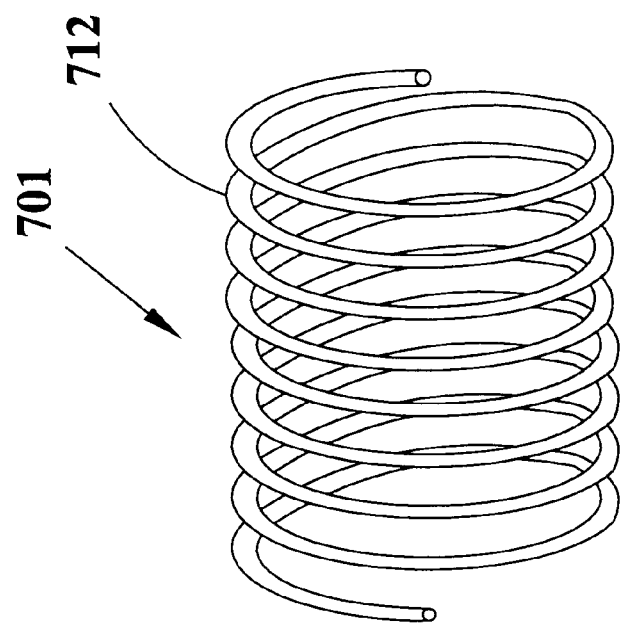
Figure 9:
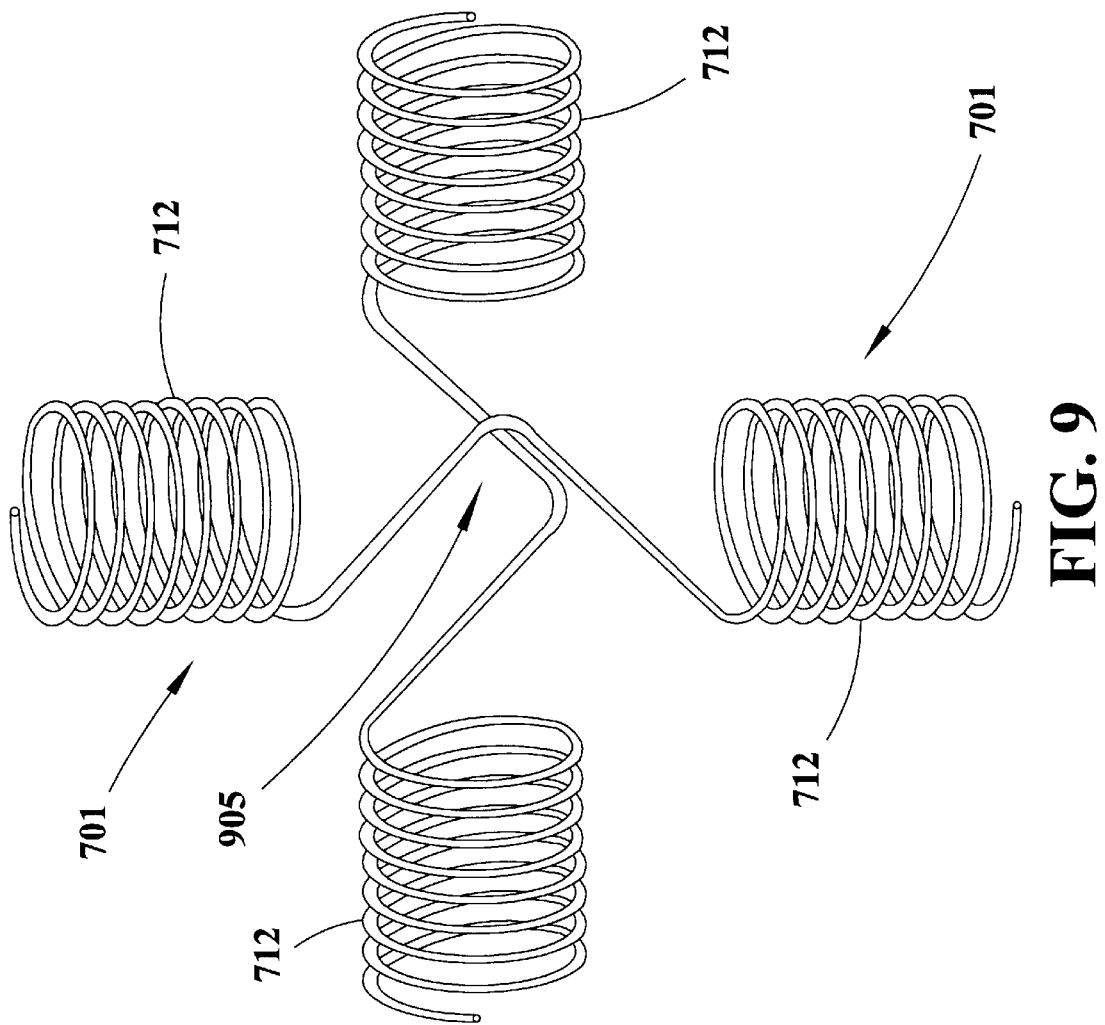
Figure 10:
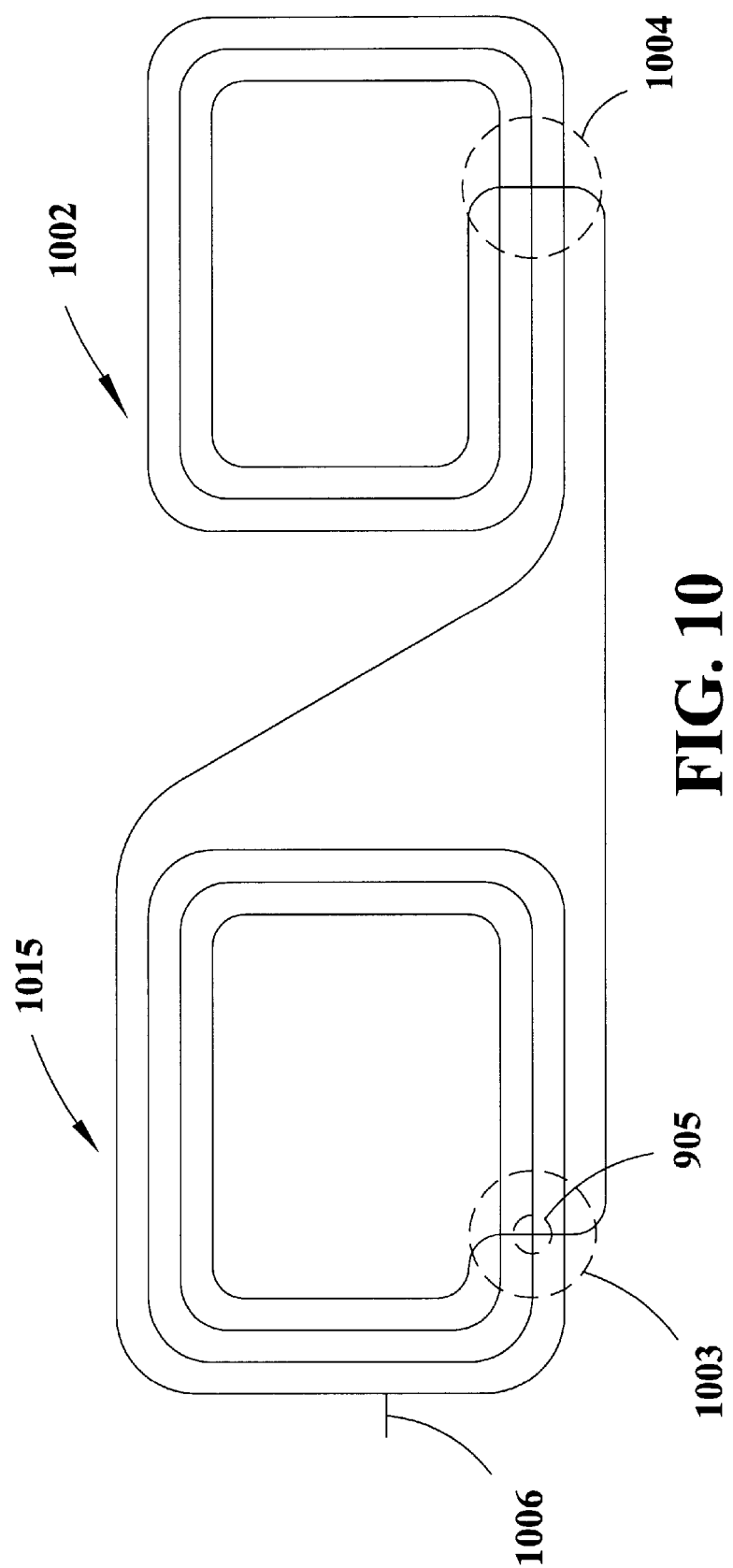
Figure 11:
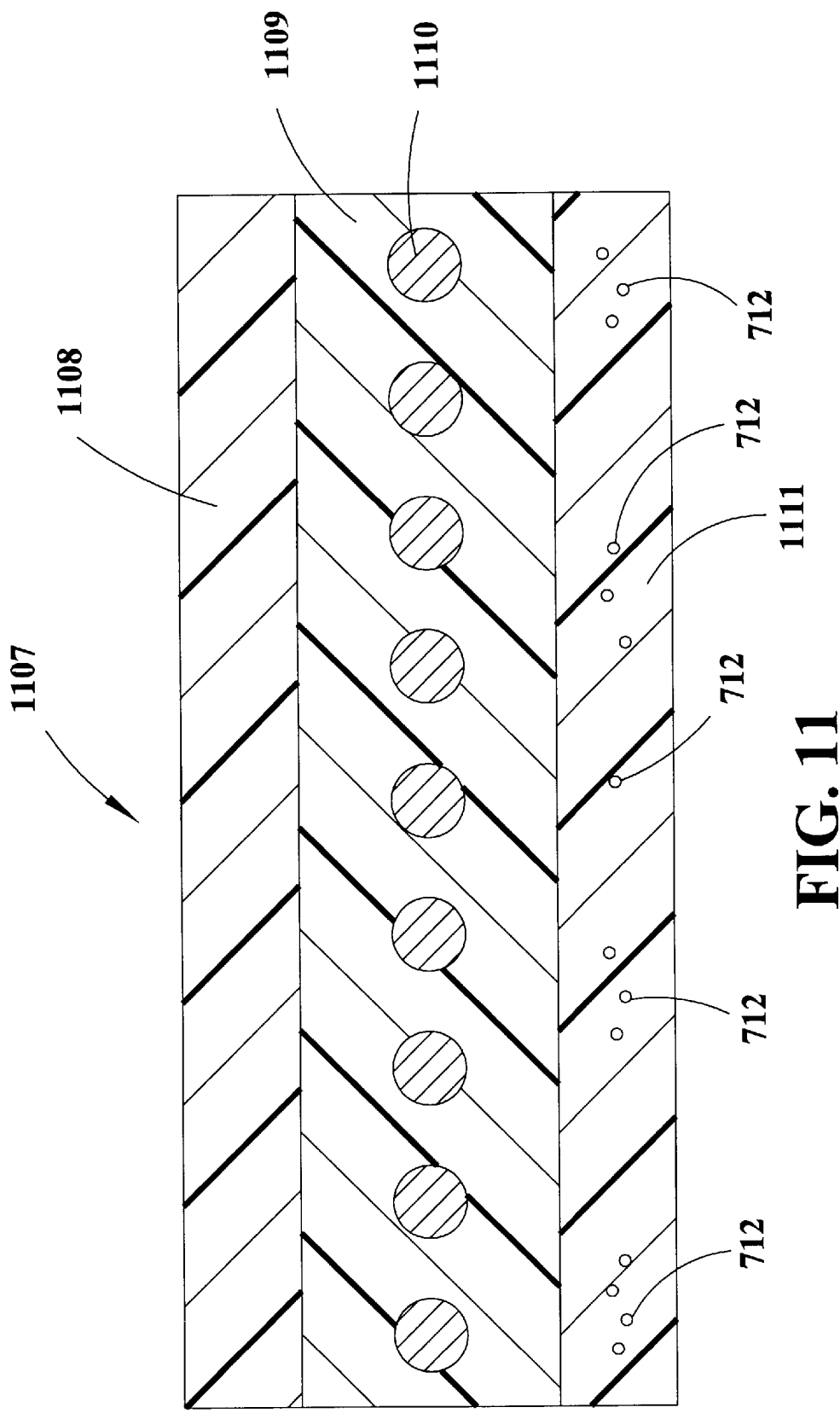
Figure 12:
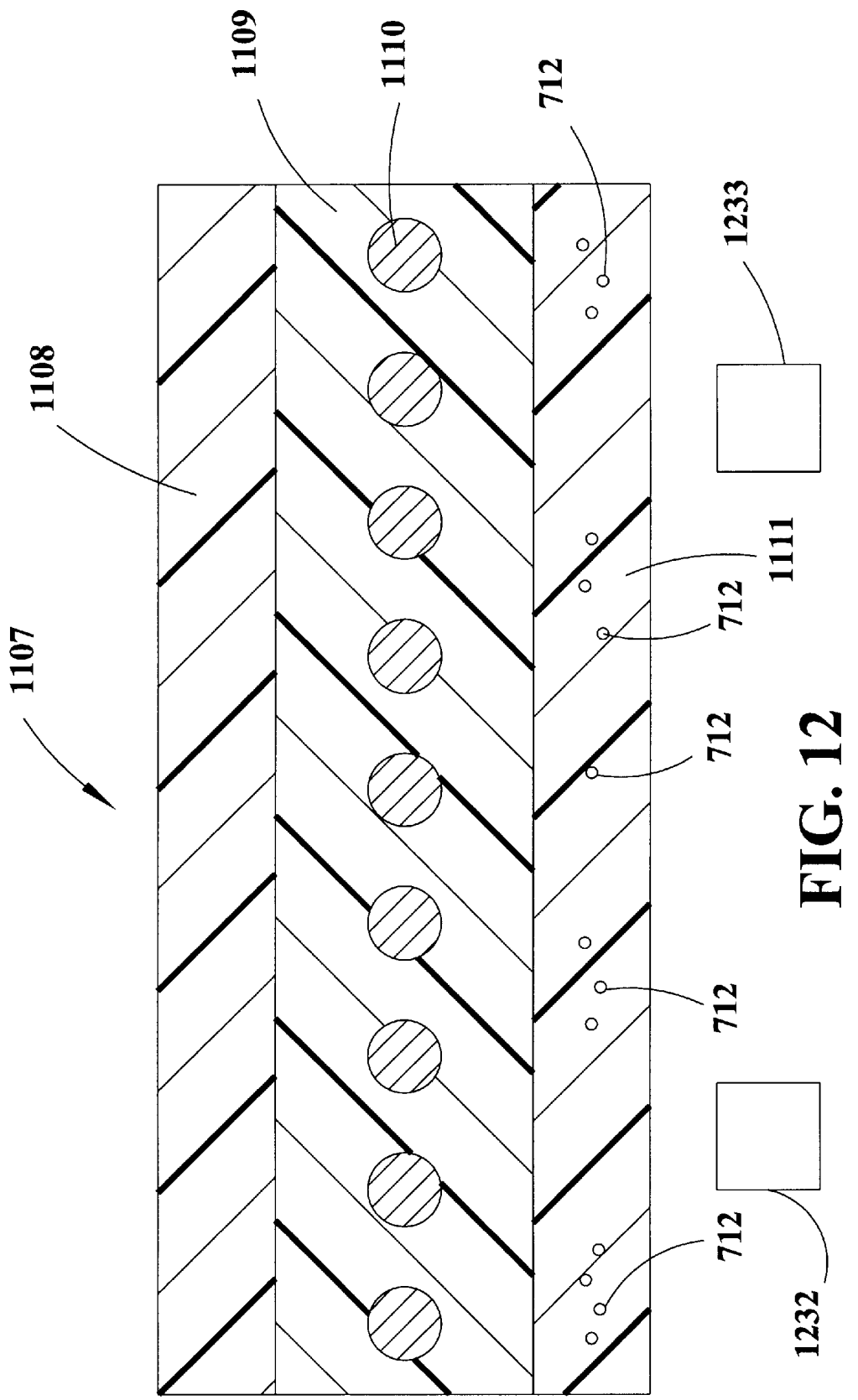
Figure 13:
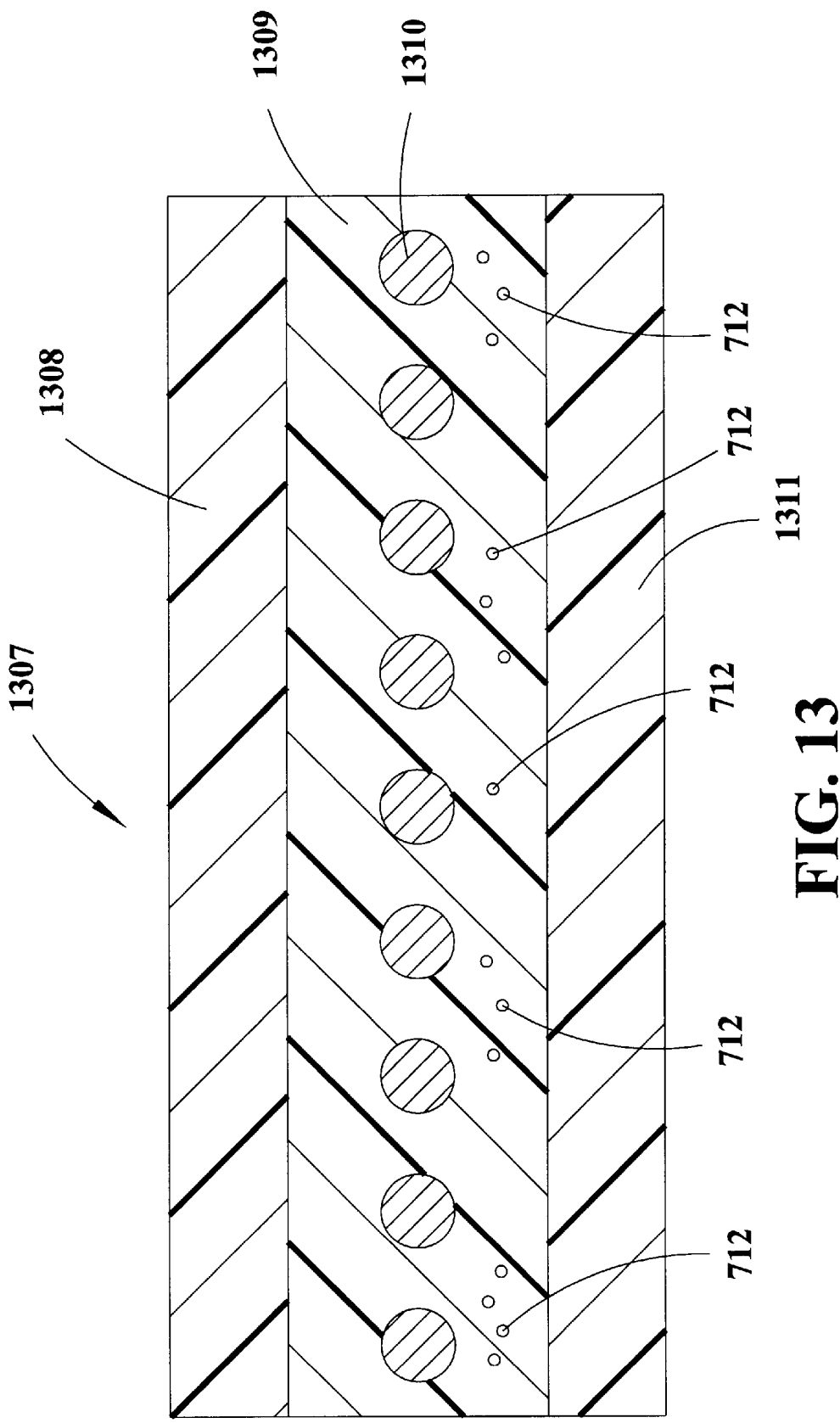
Figure 14:
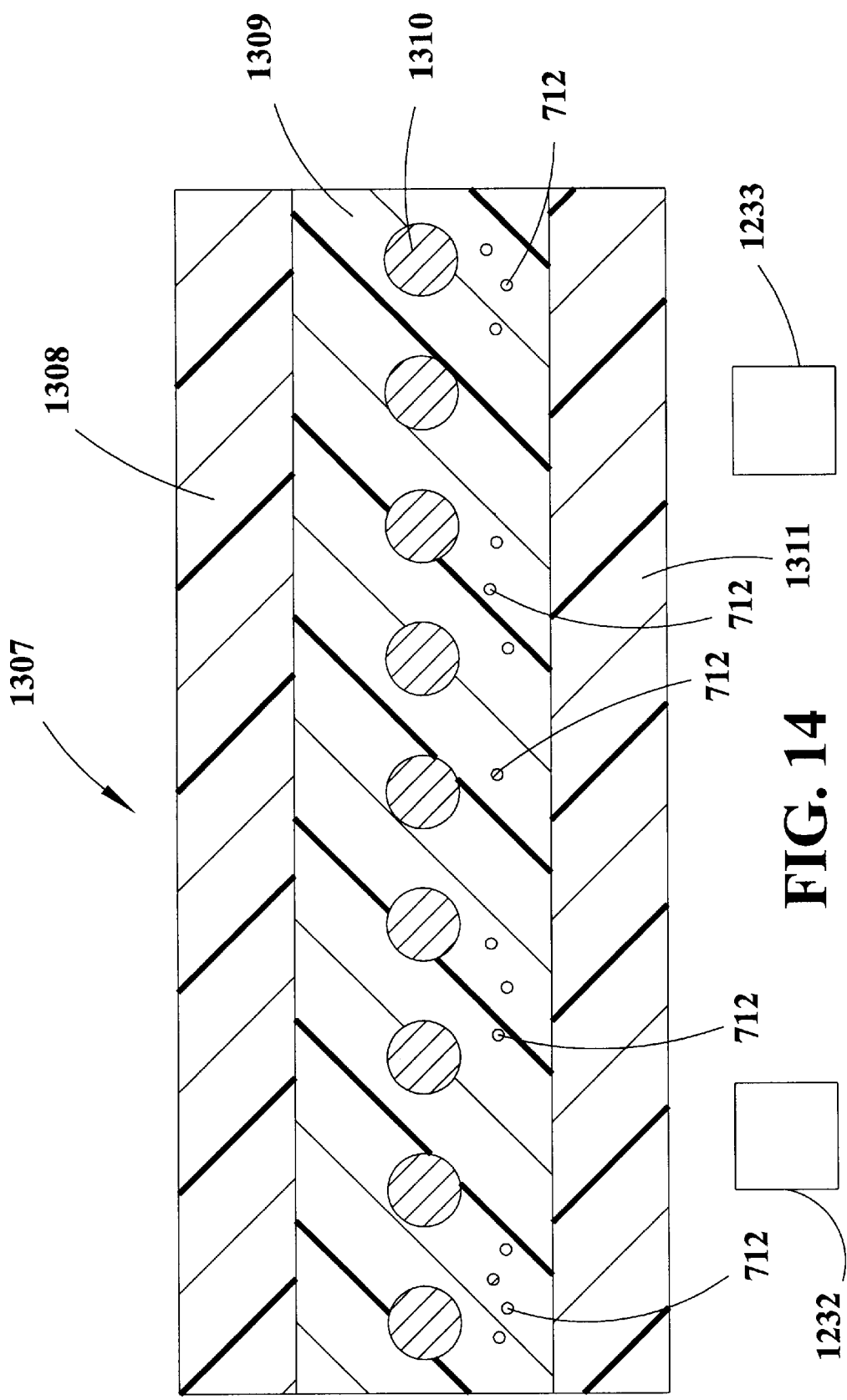
Figure 18:
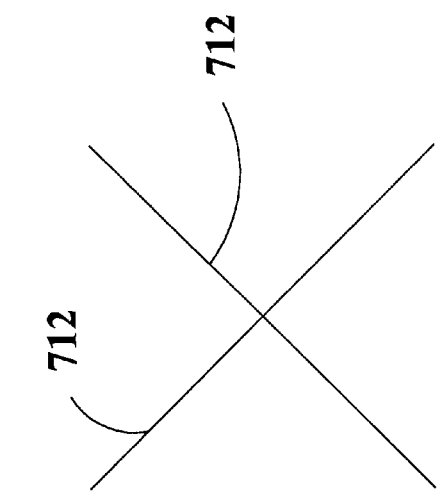
Figure 17:
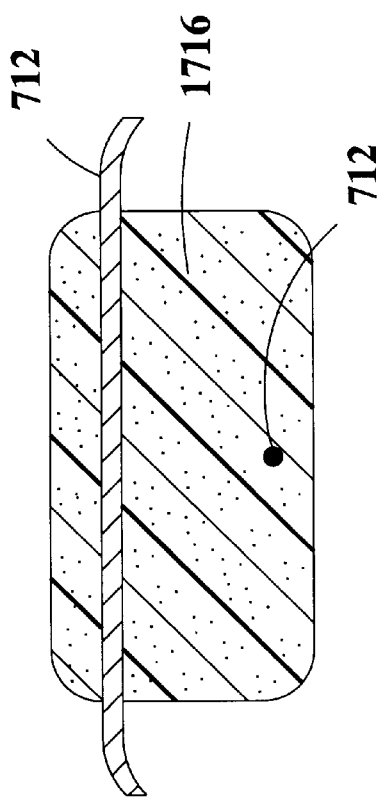
Figure 19:
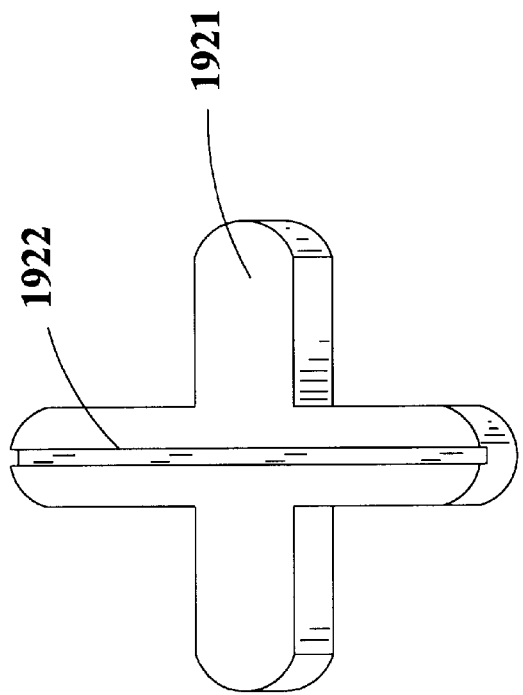
Figure 20:
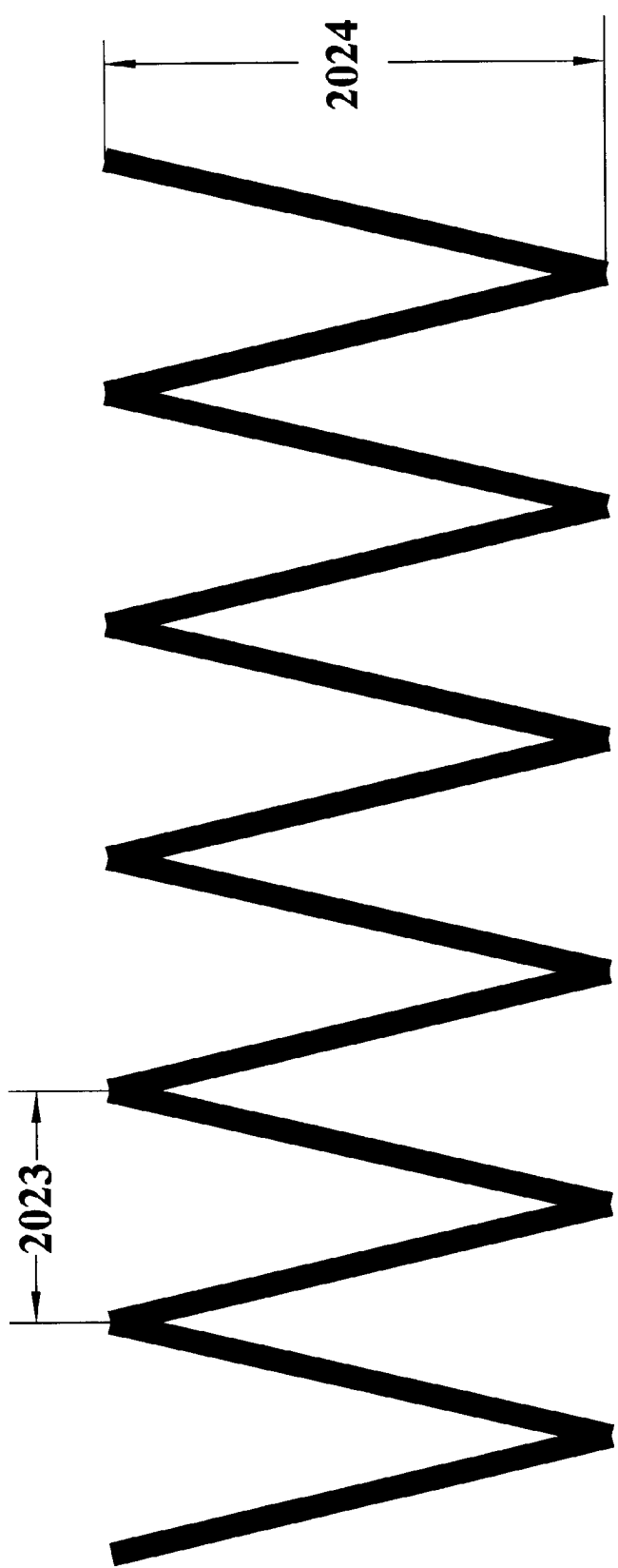
Figure 22:
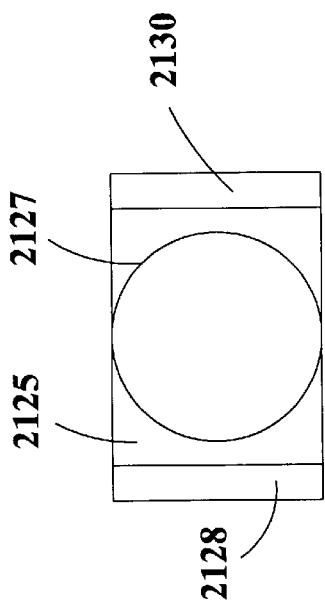
Figure 23:
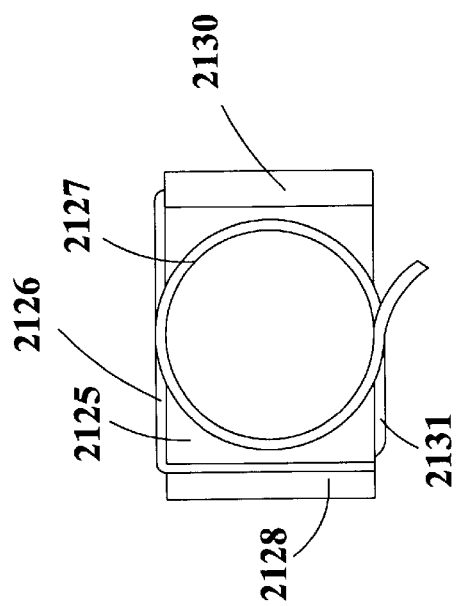
Figure 21:
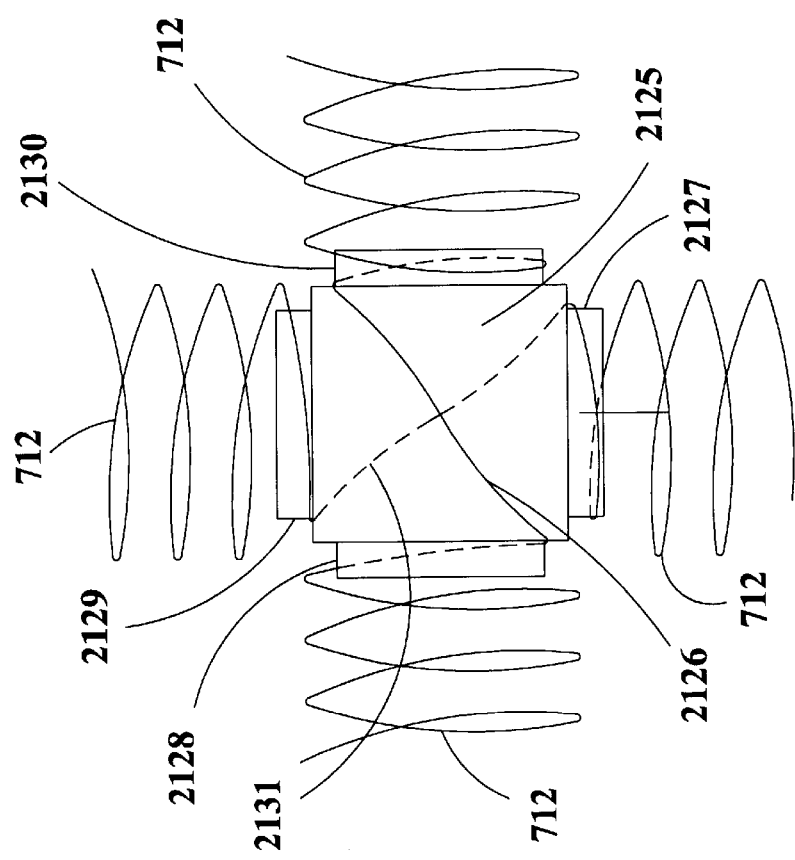
Figure 25:
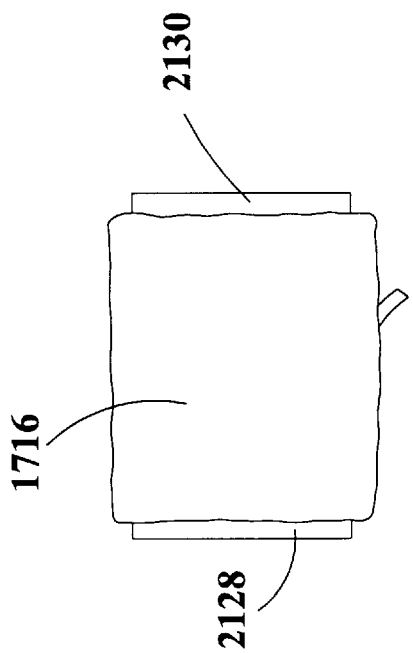
Figure 24:
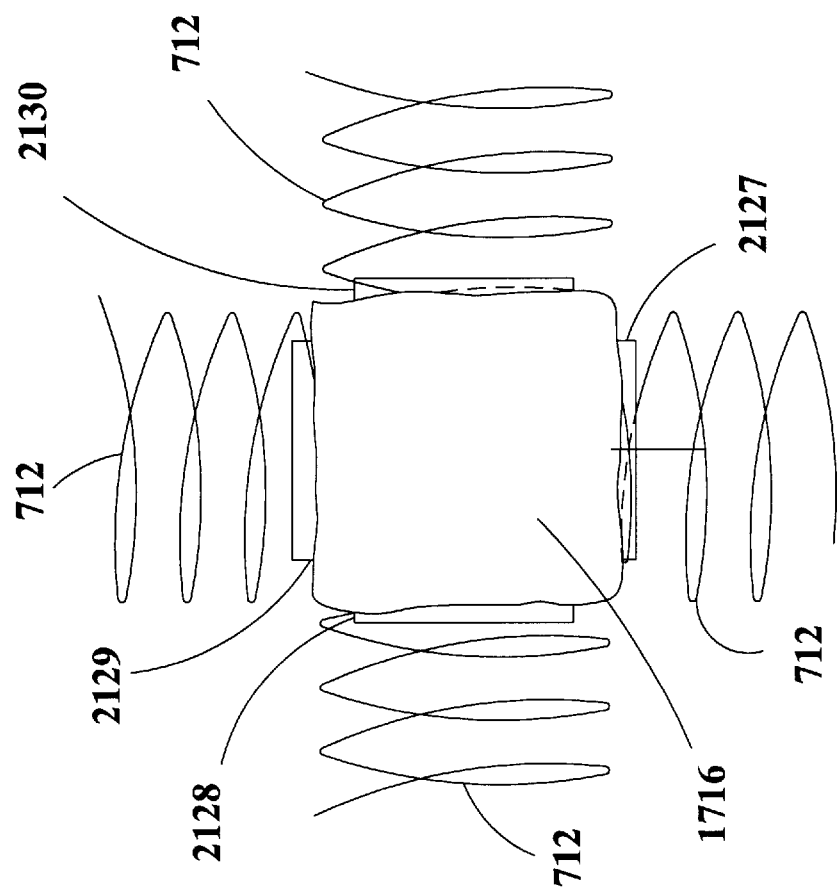

The structure, operation, and advantages of the present preferred embodiment of the invention will become further apparent upon consideration of the following description taken in conjunction with the accompanying drawings, wherein:

FIG. 1 is a schematic of the prior art rip detection system;

FIG. 2 is a cross-sectional exploded view of the prior art conveyor belt construction;

FIG. 3 is a cross-sectional view illustrating the spatial relationship of conductors in a crossover according to the prior art;

FIG. 4 is a cross-sectional view of the cross-through of microcoil springwire conductors according to the present invention;

FIG. 5 is a schematic of the conveyor belt rip detection system according to the present invention;

FIG. 6 is a cross-sectional exploded view of the conveyor belt construction according to the present invention;

FIG. 7 is a perspective view of the microcoil springwire employed in the sensor according to the present invention;

FIG. 8 is a cross sectional view of the microcoil springwire of FIG. 7 illustrating a rubber coated wire according to the present invention;

FIG. 9 is a perspective view of the cross-through of microcoil springwire conductors according to the present invention;

FIG. 10 is a diagrammatic representation of the microcoil springwire arranged in multiple loops for a sensor according to the present invention;

FIG. 11 is a cross sectional view of a first embodiment of the conveyor belt taken along the lines 13—13 of FIG. 15 according to the present invention;

FIG. 12 is a cross sectional view of the first embodiment of the conveyor belt similar to that of FIG. 11 with the addition of an external energy source and an external receiver in proximity to the conveyor belt according to the present invention;

FIG. 13 is a cross-sectional view of another embodiment of the conveyor belt taken along the lines 13—13 of FIG. 15 according to the present invention;

FIG. 14 is a cross-sectional view of the embodiment of the conveyor belt of FIG. 13 with the addition of an external energy source and an external receiver in proximity to the conveyor belt according to the present invention;

FIG. 15 is a plan view of the conveyor belt with the sensors embedded therein (not shown) according to the present invention;

FIG. 16 is a schematic view of the conveyor belt of FIG. 15 with the sensor loops exposed so as to illustrate their relative positions along the length of the belt according to the present invention;

FIG. 17 is a cross sectional view of a cross-through such as that illustrated in FIG. 9 with epoxy shown separating the microcoil springwire portions according to the present invention;

FIG. 18 is a top view illustrating the approximate orthogonal nature of the cross-through of two elongated sections of the microcoil springwire according to the present invention;

FIG. 19 is a top perspective view of a tee with a groove in which an elongated portion of the microcoil springwire resides according to the present invention;

FIG. 20 is an enlarged side view of a portion of the microcoil springwire illustrating the pitch and diameter of the microcoil springwire according to the present invention;

FIG. 21 is a plan view of the preferred embodiment of a microcoil springwire cross-through wherein the springwire has been wrapped around a tee according to the present invention;

FIG. 22 is a front view of the tee of FIG. 21 according to the present invention;

FIG. 23 is a view similar to FIG. 22 with wire wrapped around the cylindrical dowels or protrusions according to the present invention;

FIG. 24 is a view similar to FIG. 21 illustrating the epoxy/adhesive affixing the springwire to the tee according to the present invention; and FIG. 25 is a view similar to FIG. 23 illustrating the epoxy/adhesive affixing the springwire to the tee according to the present invention.

DESCRIPTION OF THE INVENTION

The present invention is directed to a conveyor belt rip detection system, as shown in FIG. 5, which incorporates signal inverting sensors 130, 140 and 150 of a conductor 301, 302 (generally a wire), as shown in FIG. 3. An important feature of the invention is to use microcoil springwire 701, as illustrated in FIG. 7, for the conductor in the sensors 130, 140, 150. Another important feature of the invention relates to the manner in which the conductors cross over (or through) each other as shown in FIG. 4, which illustrates the cross-through of the conductor portions 401, 402 of the sensors 130, 140, 150 of the present invention. Reference numeral 401 indicates one portion of a sensor loop conductor made of microcoil springwire 701, and reference numeral 402 indicates another portion of the same sensor loop conductor crossing-through within the total height 403 of the microcoil. Various embodiments of the present invention are disclosed hereinbelow which provide various means of insulating the conductor portions 401, 402 from each other where the portions cross through each other.

FIG. 5 illustrates the conveyor belt rip detection system of the present invention. Sensors 130, 140 and 150 are spaced apart from each other and are embedded in a conveyor belt 540. Conveyor belt 540 moves in the direction of arrow 535 and is driven by roller (or pulley) 538 and roller 539 follows. Typical systems incorporate multiple un-driven rollers 539 for long belts 540, and may also include multiple driven rollers 538. Sensors 130, 140, 150 pass over transmitter/exciter 1232 and receiver/detector 1233. Receiver 1233 communicates with control circuitry 534. If the control circuitry 534 senses a discontinuity in any of the sensors 130, 140 and 150, it then signals motor controller 536 to stop motor 537. Transmitter/exciters and receiver/detectors are known in the art, as generally described in the U.S. Pat. No. 4,854,446.

FIG. 6 illustrates the process for manufacturing the conveyor belt 540 wherein a section 600 of conveyor belt is shown prior to vulcanization. A load carrying cover 602 has a layer of tie gum 603 affixed thereto. Reinforcing cables 604 running the length of the conveyor belt 540 are disposed between the gum layer 603 and a gum layer 606 on the inner side of a pulley cover 607. After the sensors 130, 140, 150 are placed within the conveyor belt, such as the sensor made of microcoil springwire 701, as shown in FIG. 7 and discussed in more detail below, the belt is disposed in a compactor 601 that applies pressure to the load carrying cover 602 and the pulley cover 607 to compress the components of the conveyor belt together. Then the completed conveyor belt assembly 600 is vulcanized.

FIG. 7 is a perspective view of a section of a springwire conductor 712 formed into a microcoil springwire 701 which is employed as sensors 130, 140, 150 to detect rips in the conveyor belt 540. The use of the microcoil springwire 701 for conveyor belt rip detection system sensor conductors is a feature of this invention, intended to provide flexibility and fracture resistance, as well as enabling thinner overall sensors 130, 140, 150 due to the methods described hereinbelow of crossing-through where the conductors cross (as illustrated in FIG. 4).

Referring to FIG. 8, there is shown a cross sectional view of the microcoil springwire 701 illustrating an electrical insulator 835 (e.g., rubber) coating the springwire conductor 834, which is preferably brass or copper plated steel. The gauge of the springwire can typically be in the range of 0.005 to 0.030 inches and preferably in the range of 0.010 to 0.020 inches and the diameter 2024 (see FIG. 20) of the microcoil 701 is in the range of 0.025 to 0.175 inches and preferably in the range of 0.050 to 0.10 inches. The insulation or rubber coating 835 is optional.

FIG. 9 is a perspective view of the microcoil springwire 701 illustrating the springwire conductors 712 disposed in a cross-through 905 of a sensor 130, 140, 150.

FIG. 10 is a diagrammatic representation of the microcoil springwire 701 arranged in multiple loops 1002 and 1015 to form a signal inverting type of sensor 130, 140, 150. Reference numerals 1003 and 1004 each indicate a dashed circle indicating three crossing places which are crossthroughs. Reference numeral 905 indicates a single crossthrough such as in FIG. 9. Preferably the tee 2125 of FIG. 21 is used at each cross-through 905 to prevent shortcircuiting of the conductor 712 where it crosses through itself. The microcoil springwire 701 is formed into a signal inverting pattern and comprises just one springwire conductor 712 with its two ends joined together as indicated by reference numeral 1006 to form an endless loop. The joint 1006 can be made, for example, by braiding, soldering or by a mechanical connector, all of which are known in the electrical trades. The microcoil springwire 701 is arranged to cross through (as in FIG. 4) rather than over or under itself (as in prior art FIG. 3), so that the two crossing portions of microcoil springwire conductor 701 are in substantially the same plane.

FIG. 11 is a cross sectional view of a first embodiment of the conveyor belt taken along the lines 13—13 of FIG. 15. Conveyor belt 1107 is comprised of three sections: a top section 1108 which is a load carrying surface which is affixed by known technology to a middle section 1109 comprising tie gum and a fabric carcass or reinforcing cables 1110. Those skilled in the art may refer to the middle section 1109 as the carcass section. Middle section 1109 includes plies of fabric or reinforcing steel cables 1110 which typically run longitudinally within the conveyor belt 1107. Pulley cover 1111 is affixed to the middle section 1109 as is known in the art. Cross-sections of the micro-coiled springwire conductor 712 of the microcoil springwire 701 are shown vulcanized into the pulley cover 1111. Coiled conductor portions 712 illustrated in cross-section in FIG. 11 reside in substantially the same plane. The plane in which the conductor 712 microcoils reside is approximately the thickness (0.10") of the diameter 2024 of the microcoils as illustrated in FIG. 20. FIG. 20 is an enlarged side view of a portion of the microcoil springwire 701 illustrating the pitch 2023 and diameter 2024 (0.10") of the microcoil springwire.

It is highly desirable to provide the sensor 130, 140, 150 loops and cross-throughs of the microcoil springwire 701 in substantially a single plane so as to minimize the thickness of the pulley cover 1111. Using the microcoil springwire 701 provides flexure capability so as to protect against inadvertent fracturing of the sensor 130, 140, 150. There are substantial cost savings in using a thinner pulley cover 1111 which is enabled by the use of a flexible microcoil springwire 701 with cross-throughs in a single plane. The microcoil springwire 701 is designed to flex and rotate without permanent deformation or fracture.

FIG. 12 is a cross sectional view of the conveyor belt 1107 of FIG. 11 with the addition of an external energy source 1232 (sometimes called an exciter or transmitter) and an external receiver 1233 (sometimes called a detector) in proximity to the pulley cover 1111 of the conveyor belt 1107. Also, see FIG. 5 for a schematic view of the belt rip detection system, and see FIG. 10 for a top view of the sensor 130, 140, 150 loops made of microcoil springwire conductor 712 which are illustrated in cross-section in FIG. 12. In operation, the sensor loops 1002, 1015 pass in proximity to the external energy source 1232 and the external receiver 1233. The loops 1002 and 1015 are exposed so as to illustrate their positions across the width of the belt relative to the external detector 1233 and external exciter 1232. The schematic drawing of FIG. 10 indicates that the loops 1002 and 1015 are generally arranged in a signal inverting pattern. FIG. 10 illustrates three loops in each side 1002 and 1015. However, those skilled in the art will recognize that a different number of loops may be used without departing from the spirit and scope of the invention as claimed. Further, those skilled in the art will recognize that a different pattern of loops may be employed without departing from the spirit and scope of the claimed invention.

FIG. 13 is a cross-sectional view of the preferred embodiment of the conveyor belt 1307 (compare to the first embodiment 1107) taken along the lines 13—13 of FIG. 15. Cross-sections of the micro-coiled springwire conductor 712 of the microcoil springwire 701 are shown vulcanized into tie gum which surrounds steel reinforcing cables 1310 in the middle section or carcass 1309. Coiled conductor portions 712 illustrated in cross-section in FIG. 13 reside in substantially the same plane. The plane in which the conductor 712 microcoils reside is approximately the thickness (0.10") of the diameter 2024 of the microcoils as illustrated in FIG. 20. An optional insulating spacer (not shown) such as a fabric layer may be positioned between the springwire conductors 712 and the reinforcing cables 1310. Pulley cover 1311 can be made of a thinner construction in this preferred embodiment 1307. Reference numeral 1308 denotes the load carrying surface of the conveyor belt 1307.

FIG. 14 is a cross-sectional view of the preferred embodiment of the conveyor belt 1307 of FIG. 13 with the addition of an external energy source 1232 and an external receiver 1233 in proximity to the conveyor belt 1307. If there is a break in the springwire conductor 712, it is sensed by receiver 1233 and control circuitry 534 signals the motor controller 536 to stop motor 537 (also see FIG. 5).

FIG. 16 is a top view of a conveyor belt 1107 with the sensors embedded therein. Reference numerals 130, 140 and 150 represent three of the many sensors typically employed in a belt, and are typically spaced approximately 25 to 250 feet from each other. Also see FIG. 5. Referring to FIGS. 12 and 14, as the belt 1107, 1307 moves, it passes over an external pair comprising an exciter 1232 and a receiver 1233 which then interrogates the microcoil springwire 712 of the sensor (e.g., 130, 140, 150) for continuity. If a discontinuity is detected the belt is automatically shut down and inspected and/or repaired. Various control schemes may be employed to detect a damaged belt. For instance, the spacing between sensors may be varied and/or multiple open circuits (i.e., open sensors) may be detected before the belt is shut down.

FIG. 17 is a cross sectional view of a cross-through such as the cross-through 905 illustrated in FIG. 9. Note that FIG. 9 does not illustrate adhesive 1716 (e.g., epoxy) between the elongated portions of the microcoil 701 in the cross-through 905, but there is a space between the microcoil springwire conductors 712 in the elongated portions of the microcoil 701. Epoxy/adhesive 1716 is used to separate the portions of springwire conductor 712 from each other, thereby preventing short-circuiting. If a tee 2125 as illustrated in FIG. 21 is not used to assist in the separation of the conductor portions 712, then epoxy 1716 should be used to ensure that they are insulated each from the other. Although the springwire conductor 712 itself may be insulated (as shown in FIG. 8), if two portions of the springwire conductor 712 happen to be in engagement, there is a possibility that the insulation (e.g., 835) may wear away. In this instance the detector/receiver 1233 may not receive correct information as to the integrity of the belt.

FIG. 18 is a top view illustrating the approximate orthogonal nature of the cross-through of two elongated portions of the microcoil springwire 712. In an elongated helical arrangement the helix approximates a sine wave enabling the microcoil springwire conductors 712 to pass through each other, and at this cross-through the orientation of the conductors 712 are approximately orthogonal each to the other.

FIG. 19 is a top perspective view of a tee 1921 with a groove 1922 in which an elongated portion of the microcoil springwire conductor 712 can reside to form a cross-through such as those illustrated in FIGS. 9 and 18, with the tee 1921 providing insulation between the microcoil springwire conductor portions 712. A reciprocal groove (not shown) is located on the bottom (opposite face) of the tee 1921. An adhesive (not shown) may be applied to affix the conductor 712 in the grooves 1922 and onto the tee 1921.

FIG. 20 is an enlarged side view of a portion of the microcoil springwire (e.g., 701) illustrating the pitch 2023 and coil diameter 2024 of the microcoil springwire in its normal configuration (not elongated for a cross-through). The coil diameter 2024 of the microcoil is in the range of 0.025 to 0.175 inches and preferably in the range of 0.050 to 0.10 inches. It is this configuration that the microcoil springwire 701 takes at places where it does not cross-through itself. The wire has a pitch 2023 of between one to four diameters and can stretch out in length to several times its original length. The springwire conductor 712 is electrically conductive and is suitably plated high-tensile strength steel which exhibits good mechanical strength and resistance to corrosion when vulcanized into a pulley cover 1111, 1311, top cover 1108, 1308 or into the tie gum of the carcass 1109, 1309 of a conveyor belt 1107, 1307.

FIG. 21 is a plan view of the preferred embodiment of a microcoil springwire 701 cross-through wherein the microcoil springwire conductor 712 has been wrapped around a tee 2125 made of a non-conductive material such as plastic. FIG. 22 is a front view of the tee 2125 of FIG. 21. The conductor 712 in the individual coils of the microcoil springwire 701 is elongated to wrap around the first cylindrical dowel 2127, the second cylindrical dowel 2128, the third cylindrical dowel 2129 and the fourth cylindrical dowel 2130. Further elongation or straightening is necessary to traverse the tee 2125 which ensures separation of conductor portion 2126 which traverses the top of tee 2125 and conductor portion 2131 which traverses the bottom of tee 2125. Reference numerals 2126 and 2131 have been assigned to those portions of springwire conductor 712 wherein the helical microcoil has been substantially elongated to traverse tee 2125.

FIG. 23 is a view similar to FIG. 22 illustrating the springwire conductor 712 wrapped around the cylindrical dowels or protrusions 2127, 2128, and 2130. Reference numerals 2126 and 2131 indicate the elongated portions of the springwire conductor 712 which traverse the tee 2125.

FIG. 24 is a view similar FIG. 21 illustrating an adhesive 1716 (e.g., epoxy) affixing the springwire to the tee. The adhesive 1716 ensures that the conductors 712 stay firmly affixed to the tee. Where there are multiple cross-throughs, multiple tees 2125 are used, one tee 2125 per cross-through. FIG. 25 is a view similar to FIG. 23 illustrating adhesive 1716 affixing the springwire 712 to the tee 2125.

It will be understood by those skilled in the art that many changes and modifications may be made to the described invention without departing from the spirit and scope of the claims which are appended below.

I claim:

1. A conveyor belt incorporating within it a rip detection sensor comprising a conductor formed in an endless loop arranged in a signal inverting configuration wherein the conductor crosses itself in at least one crossing place, characterized in that:

the conductor is formed as microcoil springwire;

the conductor crosses itself by crossing through itself such that the microcoil springwire resides substantially in a single plane throughout the sensor including the crossing places; and means for preventing short-circuiting of the conductor at the crossing places.

2. The conveyor belt according to claim 1 characterized in that:

the means for preventing short-circuiting comprise insulation coating the conductor.

3. The conveyor belt according to claim 1 characterized in that:

the means for preventing short-circuiting comprise adhesive.

4. The conveyor belt according to claim 1 characterized in that:

the means for preventing short-circuiting comprise a tee having two grooves in which an elongated portion of the microcoil springwire conductor can reside to form a cross-through for the conductor, wherein the grooves are on opposite faces of the tee and are oriented substantially orthogonally to each other.

5. The conveyor belt according to claim 1 characterized in that:

the means for preventing short-circuiting comprise a tee having a first, second, third, and fourth cylindrical dowel, wherein the first and third dowels are on opposed sides of the tee, and the second and fourth dowels are on opposed sides of the tee; such that a first crossing portion of the microcoil springwire conductor can be wrapped around the first dowel, elongated to traverse a first side of the tee, and then wrapped around the opposing third dowel; and such that a second crossing portion of the microcoil springwire conductor can be wrapped around the second dowel, elongated to traverse a second side of the tee, and then wrapped around the opposing fourth dowel.

6. The conveyor belt according to claim 5 characterized in that:

the microcoil springwire conductor is affixed to the tee with an adhesive.

7. The conveyor belt according to claim 1 characterized in that:

the microcoil springwire conductor comprises plated high-tensile strength steel.

8. The conveyor belt according to claim 1 characterized in that:

the microcoil springwire comprises a coiled conductor with a pitch of between one to four conductor diameters, and a coil diameter of between 0.025 to 0.175 inches.

9. The conveyor belt according to claim 8 characterized in that:

the microcoil springwire comprises a coiled conductor with a coil diameter of between 0.050 to 0.10 inches.

10. The conveyor belt according to claim 1 wherein the belt comprises a top load bearing surface, a middle carcass layer, and a pulley cover, characterized in that:

the sensor is embedded within the bearing surface, the carcass layer or the pulley cover.

11. The conveyor belt according to claim 1 wherein the belt comprises a top load bearing surface, a middle carcass layer and a pulley cover, characterized in that:

the sensor is embedded within the pulley cover.

12. The conveyor belt according to claim 1 characterized in that:

the sensor includes loops configured for use in connection with a belt rip detection system which includes external transmitter/exciters, and receiver/detectors.

13. A method of manufacturing a conveyor belt incorporating within it a rip detection sensor comprising a conductor formed in an endless loop arranged in a signal inverting configuration wherein the conductor crosses itself in at least one crossing place, characterized by:

forming the conductor as a microcoiled springwire;

forming the crossing places such that the microcoil springwire conductor crosses through itself and resides substantially in a single plane throughout the sensor including the crossing places; and preventing short-circuiting of the conductor at the crossing places.

14. The method according to claim 13, characterized by:

insulating the conductor to prevent short-circuiting.

15. The method according to claim 13, characterized by:

providing adhesive between the conductor portions at the crossing places.

16. The method according to claim 13, characterized by:

providing tees at the crossing places.

17. The method according to claim 16, characterized by:

elongating portions of the conductor in the crossing places, wrapping the elongated portions of the conductor around the tees, and affixing the conductor to the tees with adhesive.

18. The conveyor belt rip detection system, comprising:

a conveyor belt incorporating within it a rip detection sensor comprising a conductor formed in an endless loop arranged in a signal inverting configuration wherein the conductor crosses itself in at least one crossing place, and the sensor has loops;

a drive motor;

a driven roller driven by the drive motor;

a following roller;

an external transmitter coupled with the sensor loops;

an external receiver coupled with the sensor loops; and control circuitry controllably connected between the external receiver and a motor controller for controlling the action of the drive motor; characterized in that:

the conductor is formed as microcoil springwire;

the conductor crosses itself by crossing through itself such that the microcoil springwire resides substantially in a single plane throughout the sensor including the crossing places; and means for preventing short-circuiting of the conductor at the crossing places.

19. The conveyor belt rip detection system according to claim 18, characterized in that:

the means for preventing short-circuiting is selected from the group consisting of adhesive, insulation coating the conductor, a tee having two grooves, and a tee having a first, second, third, and fourth cylindrical dowel.

* * * * *